Patented July 10, 1928.

1,677,116

UNITED STATES PATENT OFFICE.

ALFRED R. L. DOHME, OF BALTIMORE, MARYLAND, ASSIGNOR TO SHARP & DOHME, INC., OF BALTIMORE, MARYLAND, A CORPORATION OF NEW JERSEY.

NORMAL AMYLYL RESORCINOL.

No Drawing.     Application filed April 29, 1925.   Serial No. 26,811.

This invention relates to normal amylyl resorcinol having the formula $C_6H_3(OH)_2.CO.CH_2.CH_2.CH_2.CH_3$.

The new acyl resorcinol of the present invention may be prepared by reacting with valeric acid on resorcinol in the presence of a condensing agent, such as zinc chloride. The amylyl resorcinol thus produced may be purified, for example, by distillation in a vacuum, and by recrystallization from various solvents or mixtures of solvents.

The normal amylyl resorcinol of the present invention may be produced in the form of an oil, or, when purified to substantial purity, may be obtained in the form of crystallized products.

The new acyl resorcinol can be produced, for example, by the process of the following specific example:

20 parts of anhydrous zinc chloride are dissolved in 100 parts of normal valeric acid, the solution being aided by heating and stirring. The temperature is maintained near 135° C. and about 33 parts of resorcinol are gradually added over a period of about 20 minutes and the reaction mixture is then stirred for a period of about 3 hours at a temperature of about 135 to 145° C. At the end of this time an equal volume of water is added and the mixture is stirred further. The oily reaction product rises to the surface, is separated from the aqueous layer, and washed with an equal volume of water and the water then separated from the washed product. The washed product is then distilled in vacuo; the traces of water and the excess valeric acid being first distilled off and finally the normal amylyl resorcinol distilling over. The amylyl resorcinol may be further purified by redistillation and crystallization from toluene or a mixture of toluene and petroleum ether. On redistillation the distillate solidifies. On recrystallization from toluene or a mixture of toluene and petroleum ether the normal amylyl resorcinol has a melting point of 58.5 to 60° C. and a boiling point at 6 to 7 mm. of 190 to 192° C.

In this example the temperature can be somewhat varied, but in general it should be above 135° and not appreciably higher than 145°, the temperature being kept below that which will cause objectionable condensation of resorcinol with itself to form undesirable by-products. The mixture of zinc chloride and fatty acid is also advantageously heated to the active reaction temperature, e. g. around 135° C. to 145° C. before the resorcinol is added, so that reaction will take place immediately and continuously as the resorcinol is added to the reaction mixture.

At the end of the reaction the small amount of zinc chloride is readily removed by washing with water and only a limited amount of washing is needed.

The normal amylyl resorcinol of the present invention may be produced in a pure crystalline state and used as such or it may be used in the partially purified state as an oil for the production of other compounds, such as alkyl resorcinols by reduction.

This application is a continuation in part of my prior application Serial No. 654,928 filed July 31, 1923.

I claim:

1. A new product comprising normal amylyl resorcinol having the formula $C_6H_3(OH)_2.CO.CH_2.CH_2.CH_2.CH_3$.

2. As a new product pure normal amylyl resorcinol having the formula $C_6H_3(OH)_2.CO.CH_2.CH_2.CH_2.CH_3$, and being a crystalline compound having a melting point of about 58.5 to 60° C. and boiling at 6 to 7 mm. at 190–192° C.

In testimony whereof I affix my signature.

ALFRED R. L. DOHME.